No. 651,022. Patented June 5, 1900.
J. P. STERLING.
APPARATUS FOR SEPARATING GOLD FROM SAND.
(Application filed Dec. 9, 1899.)
(No Model.) 3 Sheets—Sheet 1.
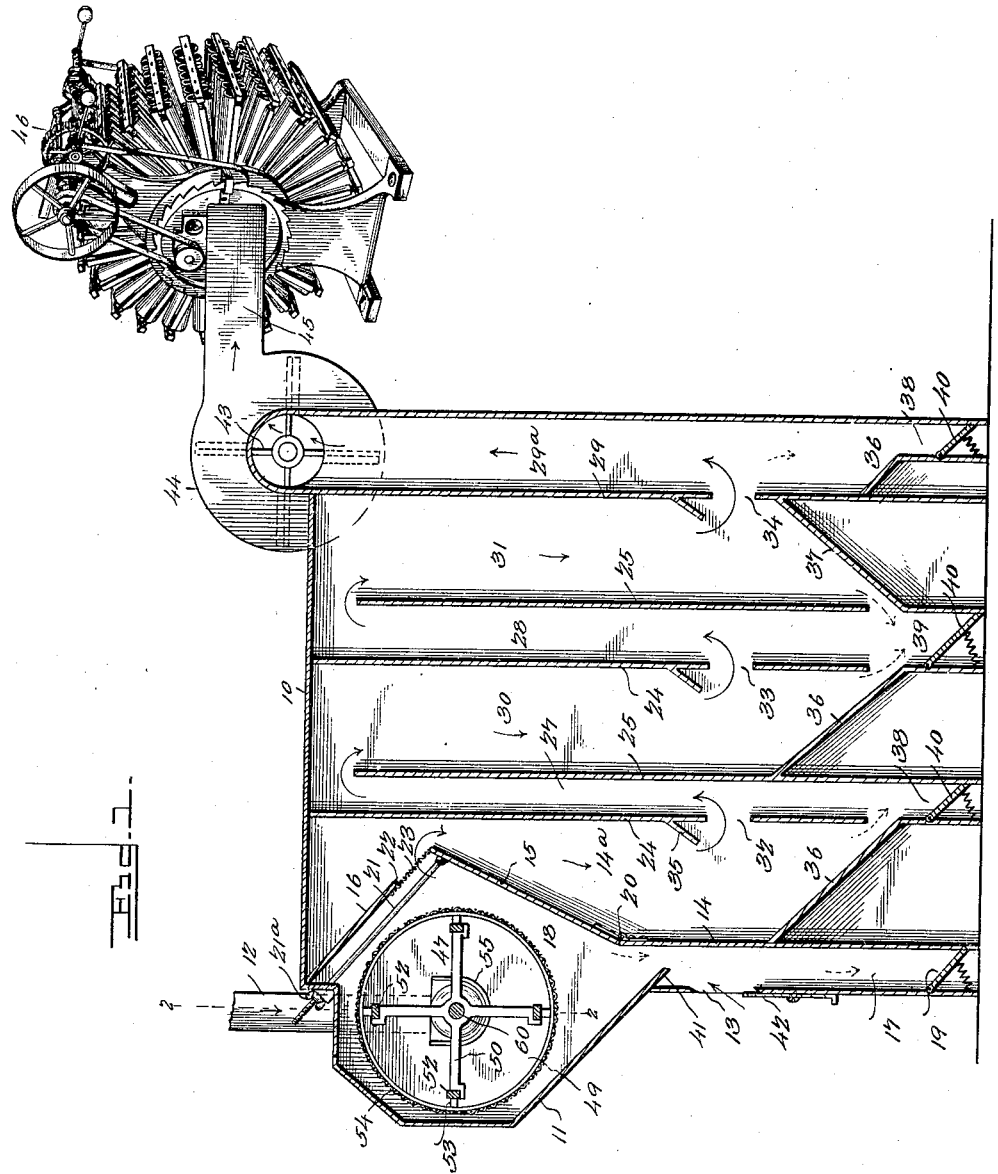

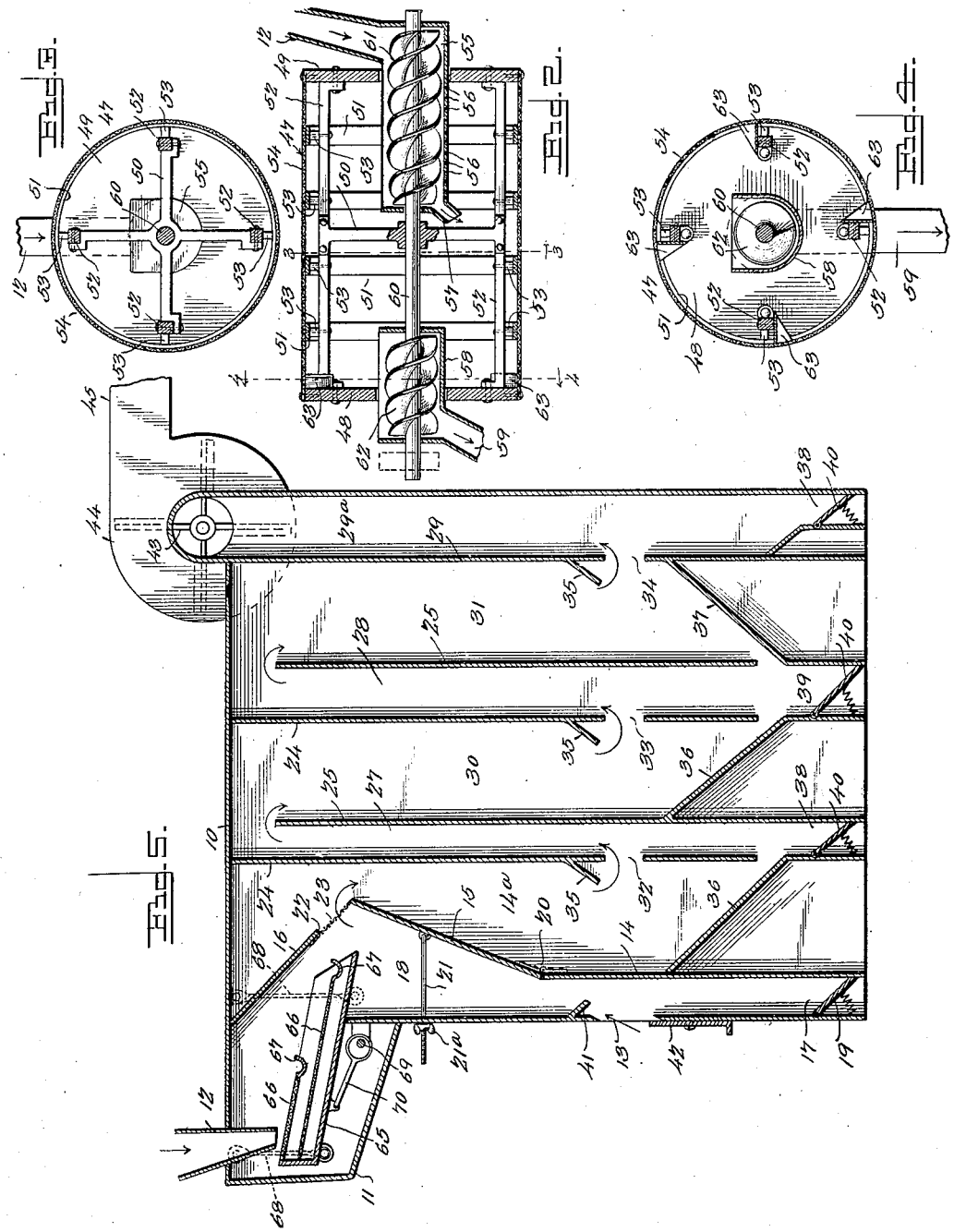

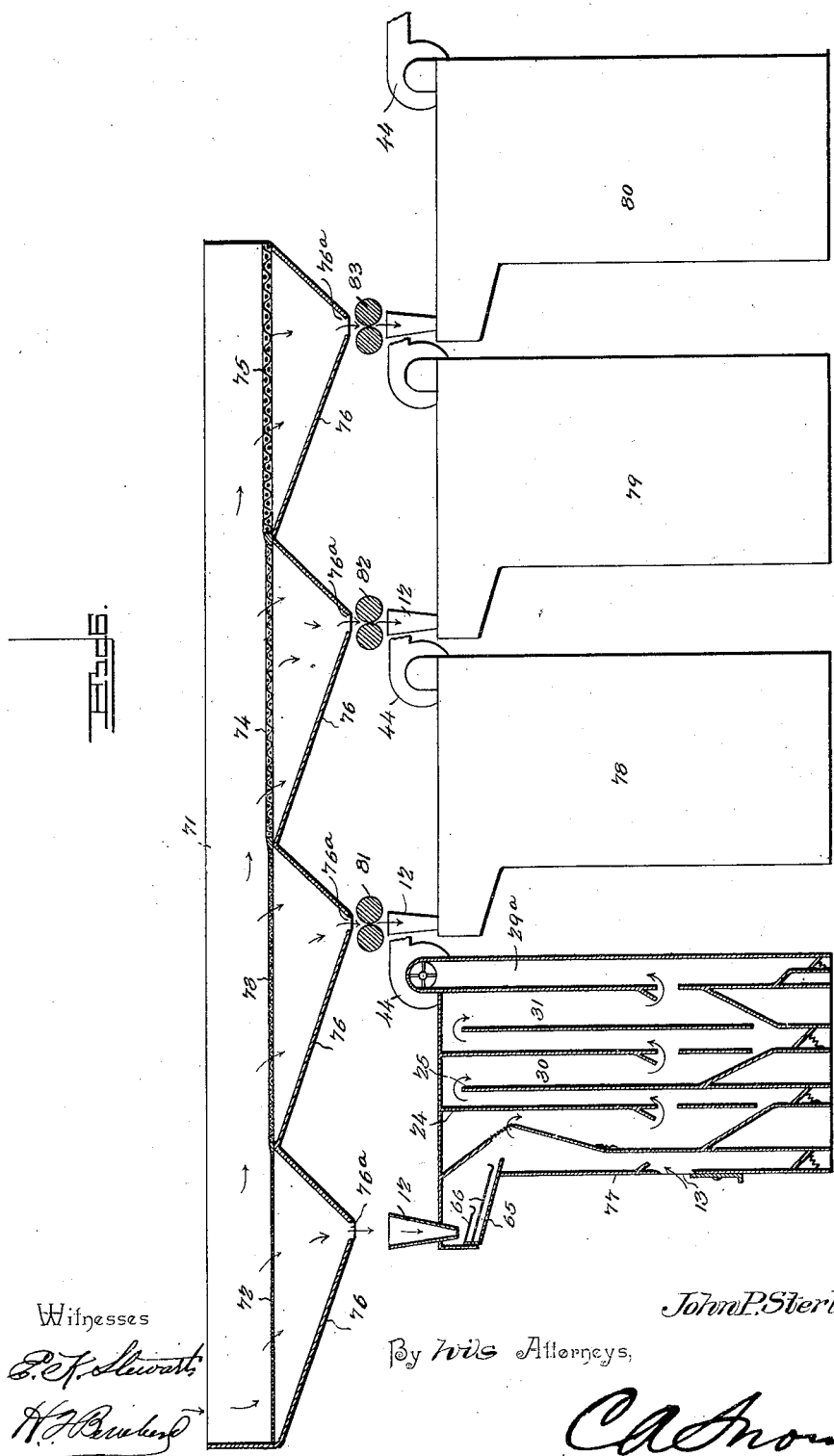

UNITED STATES PATENT OFFICE.

JOHN P. STERLING, OF KANSAS CITY, MISSOURI.

APPARATUS FOR SEPARATING GOLD FROM SAND.

SPECIFICATION forming part of Letters Patent No. 651,022, dated June 5, 1900.

Application filed December 9, 1899. Serial No. 739,831. (No model.)

*To all whom it may concern:*

Be it known that I, JOHN P. STERLING, a citizen of the United States, residing at Kansas City, in the county of Jackson and State of Missouri, have invented a new and useful Apparatus for Separating Gold from Sand, of which the following is a specification.

My invention relates to an apparatus for separating gold from sand by the dry or non-hydraulic process with a view to primarily collecting and saving the extremely-fine particles known as the "flour-gold" as well as the larger particles of precious metal designated as "shot-gold" and "flake-gold."

The flour-gold is the most difficult of all kinds of gold to successfully separate from sand and other refuse because its specific gravity is lighter than the sand in which it is contained; but by my invention I am able not only to separate the larger particles, known as "shot" and "flake" gold, from the sand, but also to thoroughly eliminate the sand from the extremely-fine particles of flour-gold, the latter being collected and finally delivered in the condition similar to an impalpable powder.

One object of the invention is to provide a simple apparatus designed to attain the purposes hereinbefore briefly enumerated, in which apparatus the shot and flake gold are separated at the first stage of the operation from the sand, while the sand and foreign matter are eliminated from the flour-gold during the remaining steps of the treatment.

A further object is to provide means for disintegrating and separating the crude material as it is found in its natural condition with a view to cleaning the same from foreign matter in order that the mineral-bearing sand only may be supplied to the apparatus for pneumatic treatment therein.

A further object is to provide a novel system for the treatment of gold-bearing sand in which the gold is graded according to the size of its particles at a preliminary stage. Certain of the grades of gold and the sand are subjected to a reduction operation, and each grade is treated pneumatically for the thorough elimination of sand from the precious metal, and the latter is collected and discharged in a pure condition entirely free from foreign matter.

With these ends in view the invention consists in the construction and arrangement of parts and in the novel combinations of mechanisms, as will be hereinafter fully described and claimed.

In the accompanying drawings I have represented an apparatus for separating gold from sand which embodies the several features of my invention in their preferred form, and to these drawings I shall now refer in order to explain more clearly the nature of the invention and the manner in which the same is or may be carried into effect.

Figure 1 is a sectional elevation taken vertically and longitudinally through my apparatus, which is shown as connected operatively with a machine known in the art as a "dust-collector," said apparatus being equipped with a revoluble screen as one means for cleaning the gold-bearing sand from foreign matter. Fig. 2 is an enlarged longitudinal section through the rotary screen removed from the apparatus and showing the means by which the gold-bearing sand in its natural condition may be supplied to the screen and the refuse may be discharged therefrom, the parts of the screen being arranged to spread the gold-bearing sand along the length of the screen and discharge the same in a sheet-like condition or cloud directly into the path of the air suction-current of the apparatus. Fig. 3 is a vertical transverse section through said screen in the plane of the dotted line 3 3 of Fig. 2. Fig. 4 is a similar transverse section in the plane of the dotted line 4 4 of Fig. 2. Fig. 5 is a vertical sectional elevation through the apparatus similar to Fig. 1, but representing another type of screen mechanism for cleaning the refuse from the gold-bearing sand and discharging the latter in a sheet-like condition directly in the path of the air suction-current. Fig. 6 is a sectional elevation of a system embodying means for grading the gold according to the size of the particles and for pneumatically treating the different grades of gold individually in accordance with my invention.

The same numerals of reference are used to indicate like and corresponding parts in each of the several figures of the drawings.

10 designates the casing of my apparatus for pneumatically treating gold-bearing sand in accordance with the principles set forth. As shown, this casing is of substantially-rectangular form, although its contour is immaterial. At the upper corner of the receiving end of this casing is provided an offset screen-housing 11, which may be of any suitable construction adapted to receive a screen mechanism of either the revolving or shaking type, and this screen-housing may be built as a part of the casing 10 in order that the chamber of the screen-housing may open into or communicate directly with the primary air-chamber of the apparatus. The gold-bearing sand may be supplied by any suitable devices to the screen-housing—such, for example, as the inlet-chute 12. The suction-inlet port 13 to the apparatus is provided in the vertical front wall of the casing 10 at a point below the lower inclined wall or bottom of the screen-housing, reference being had more particularly to Fig. 1. Within the casing 10 and contiguous to the front walls thereof and the screen-housing is a vertical partition or wall 14, the upper part of which has two inclined sections 15 16. The vertical part of the wall is parallel with the front of the casing, so as to form below the inlet-port 13 a collecting-pocket 17, in which may accumulate the heavier particles of gold known as the "shot" and "flake" gold, as will hereinafter appear. The vertical stationary wall or partition 14 faces or lies opposite to the inlet-port 13; but the inclined sections 15 16 are in the horizontal plane of the screen-housing 11, whereby the inclined portions or walls 15 16 and the screen-housing form a primary treatment-chamber 18, the area of which greatly exceeds the cross-sectional area of the passage or chamber formed at the front part of the casing 10 in the plane of the inlet-port 13.

The pocket 17 is closed at its lower end by a flap-valve 19, which is held normally in a closed position and is adapted to open automatically by the weight of the shot and flake gold which accumulate in said pocket, thereby discharging the contents by gravity from the pocket.

The inclined section 15 of the wall is arranged at an angle to the section 14 and to the vertical plane of the screen mechanism in the chamber 18, said inclined section 15 lying in the plane below the horizontal plane of the axis of the screen. This inclined wall 15 lies contiguous to the screen mechanism, so that the gold-bearing sand will be discharged from said screen mechanism toward or upon the wall 15, and this screen mechanism is thus arranged to discharge the gold-bearing sand directly into the space or air-passage which is formed on one side by the wall 15. The screen mechanism which I employ operates, essentially, to spread the gold-bearing sand in a sheet-like condition or cloud and to discharge the same directly into the path of the suction-current of air which is created through the apparatus, so as to have its intake at the port 13, whereby the suction-current is of greatest or highest strength at the place where the gold-bearing sand is discharged thereinto by the screen mechanism. This wall 15 is adjustably supported in place by any suitable means—such, for example, as the hinge 20—and to the wall 15 is connected one end of an adjusting-rod 21, that passes to the outside of the casing and is held in place by any suitable means—such, for example, as the thumb-nut 21$^a$. The inclined wall 16 is arranged reversely to the inclined wall 15, and the two walls occupy such relation to each other as to produce an air-port 22 at the angle or corner formed by such reversely-inclined walls, and across this air-port is arranged a screen 23, of any suitable foraminous material, the same being secured to the fixed wall 16 or the casing in any appropriate way. The inclined wall 15 may be adjusted relatively to the screen so as to vary the cross-sectional area of the air passage or chamber between said screen and the wall 15, thus serving in a measure to regulate the strength of the current and the inclination of the wall 15 relative to the vertical partition 14. The screen 23 has meshes of suitable size to catch and arrest the larger particles of flake-gold, which are carried by the suction-current and the gold-bearing sand in an upward direction through the chamber 17 and into or through the port 22. It is to be understood that flake-gold and shot-gold are of higher or greater specific gravity than the sand in which the gold is contained, it being estimated that gold of this character is approximately nine times heavier than sand. At the initial stage of the pneumatic treatment of the gold-bearing sand immediately following its discharge from the screen mechanism and at the period when it is subjected to the strongest action of the air suction-current the sand, the flake-gold, and the flour-gold will be caught up by the current, inasmuch as the materials are discharged in a sheet-like condition or cloud into the path of the air-current. This operation is important in the pneumatic treatment of this particular material because it effects two necessary steps—to wit, first, the shot-gold being considerably heavier than the other particles of gold and sand will drop or fall by gravity through the passage or along the wall 15, so as to accumulate in the pocket 17, and, secondly, the flake-gold will be caught or arrested by the screen 23, so that the particles of flake-gold will flow or drop by gravity along the inclined wall 15 and into the pocket 17, thus thoroughly separating the shot-gold and the flake-gold at the initial step of treatment of the material and collecting gold of this character in the first pocket of the apparatus. The remaining steps of the treatment of the material are directed to the thorough elimination of the particles of sand from the flour-gold, which, as hereinbefore stated, is of lighter specific gravity than the sand and is the most difficult of all particles of gold to collect, either by the hydraulic washing process, a mechanical dry separation, or by treating the materials pneumatically.

In my apparatus I have constructed the casing to form a series of tortuous circulation-passages, in which the air-current is caused to ascend and descend alternately through chambers or passages of varying cross-sectional area, in order to gradually weaken the strength of the air-current as it progressively traverses the chambers or passages, and thereby precipitate or allow the particles of sand to drop by gravity, while at the same time effecting the important purpose of carrying off the extremely fine and light particles of flour-gold with the air-current. Vertical walls or partitions 24 depend from the top of the casing to suitable points near the bottom thereof, and other vertical walls or partitions 25 extend upwardly from the bottom of the casing to points close to the top thereof. The walls 25 are disposed close to the walls 24, so as to form the upward circulation-passages 27 28 between the two pairs of walls 24 25; but the first upward passage 27 is of less cross-sectional area than the second upward circulation-passage 28. Another vertical wall 29 is arranged parallel with the back of the casing, so as to form an upward circulation-passage 29ª, which communicates directly with the eye in the casing of a suction-fan. The space between the walls 25 24 provides a drop-passage 30, the area of which is considerably greater than the first upward circulation-passage 27 and is also of greater area than the second upward passage 28, and a similar drop-passage 31 is provided between the wall 29 and the second wall 25, the cross-sectional area of which passage 31 is equal to that of the first drop-passage 30. The final uptake-passage 29ª is greater than that of the intermediate uptake-passage 28, and thus the series of uptake-passages increase progressively in cross-sectional area from the front to the rear of the casing. The walls 24, 24, and 29 are provided with the air-ports 32, 33, and 34, respectively, which establishes communication from the drop-passages to the uptake-passages, and over these ports are inclined the baffles 35, which prevent certain parts of the material from being carried with the air-current into certain of the uptake-passages. At the bottom of the passage 14ª, between the walls 14 24, is an inclined bottom 36, and a similar bottom is provided at the lower end of the drop-passage 30. The other drop-passage 31 has a bottom 37, which is inclined toward the bottom 36 of the passage 30. The bottom 36 of the passage 14ª inclines toward the first wall 25, so as to form a pocket 38, and the bottoms 36 37 of the passages 30 31, respectively, form between themselves a pocket 39. In the bottom of the passage 29ª is a wall similar to the walls 36 and forming in the final uptake-passage another pocket 38. In each of these pockets, at the lower ends of the drop-passages, is a flap-valve 40, held closed by a suitable spring and adapted to be opened automatically by the gravity of the material accumulating in the passage.

The inclined bottom of the screen-casing is extended inwardly to a point beyond the vertical plane of the front wall of the casing, thereby forming a deflector 41, adapted to direct any material from the screen mechanism which lodges upon the inclined bottom of the casing directly into the path of the air-current drawn into the port 13, and this deflector lies below the plane of the hinge-joint for the inclined wall 15, whereby the particles of gold which traverse the wall 15 lodge upon the deflector 41 and are prevented from dropping through the port 13. The area of this inlet-port may be varied to regulate the volume of air and the strength of the current by any suitable form of valve, one type of which is represented as a slide-valve 42, held in operative relation to the port by suitable guides.

The casing 44 of the suction-fan 43 communicates directly with the upper end of the final uptake-passage 29ª, and from this suction-fan casing leads a flue 45, which communicates directly with the central port or eye of a machine known in the art as a "dust-collector" and which is designated in its entirety by the numeral 46 in Fig. 1 of the drawings. The rotation of the suction-fan at high speed creates a suction-current through the apparatus. The air is drawn in at the port 13 and passes upwardly through the chamber 18 to the port 22, from whence the current descends through the passage 14ª to the port 32, thence passes in an upward direction through the uptake-passage 27, over the top edge of the first wall 25, thence descends through the drop-passage 30, passes through the port 33, traverses an upward course through the uptake-passage 28, over the top edge of the second wall 25, then passes in a downward direction through the final drop-passage 31, then passes through the port 34, and finally makes its escape through the uptake-passage 29ª into the eye of the fan-casing. The suction-current thus pursues a tortuous course in alternately upward and downward directions through the circulation-passages of the apparatus, and this is important, because the sand is wholly eliminated from the flour-gold before the latter is carried along with the air-current into the suction-fan, from whence the flour-gold is blown into the dust-collector. As hereinbefore described, the shot-gold gravitates or falls into the pocket 17 at the initial stage of the treatment, while the flake-gold is carried along with the sand and the air-current in an upward direction through the chamber 18 until it strikes the screen 23, the latter arresting the further progress of the flake-gold with the air-current and causing gold of this character to finally lodge in the pocket 17. The sand and the extremely-fine particles of flour-gold are carried by the air-current through the successive passages, which increase in area, so as to effect a reduction in the strength of the current gradually, and this course of the circulation and the gradual reduction in strength permit the heavy and light particles of sand to gravitate as the current pursues its course through the passages 14ª, 27, 30, 28, 31, and 29ª. The particles of sand accumulate mostly in the pockets 38 39 at the bottom of the passages 14ª, 27, 30, 38, and 31, it being found that very little sand and that of the lightest character accumulates in the pocket of the passage 29ª.

It will be observed by reference to the drawings that the ports which establish communication between the vertical uptake-passages and the drop-passages, as at 32 33 34, are at some distance above the bottoms of the drop-passages, this construction causing the air-current to set up eddies in the lower portion of the drop-passages, which eddies greatly facilitate the precipitation of the sand. The baffles 35 above the said ports serve to divert the down-current in the drop-passages from the walls thereof toward the central portions of said drop-passages, thus causing the particles of sand and gold to be more thoroughly exposed to the action of the current. The inclined bottoms of the drop-passages communicate directly with the pockets formed at the bottoms of the uptake-passages, as shown. This construction is advantageous in causing the sand as it is deposited on the bottoms of the drop-passages to pass directly therefrom and accumulate in the pockets, hence keeping said inclined bottoms of the drop-passages practically clear at all times during the operation of the apparatus and avoiding contraction of the area of the drop-passages by the accumulation of sand therein, which would tend to the elimination of the eddies. It will be further observed by an inspection of the drawings that the uptake-passages alternate with the drop-passages and that the current after passing from a drop-passage into an uptake-passage has to traverse practically the entire height of the latter before reaching the next drop-passage in series, this alternating arrangement of the drop-passages and uptake-passages causing the direction of the current to be reversed in said passages and affording an increased opportunity for the particles of sand to drop and become separated from the finer lighter particles of flour-gold during the ascent of the latter through the uptake-passages, hence greatly increasing the efficiency of the pneumatic apparatus.

Although I have shown and described the dust-collector 46 as communicating with the exhaust of the suction-fan, it is evident that the flour-gold in the form of an impalpable powder may be discharged into a closed receptacle adapted to collect the flour-gold, so that it may be subjected to subsequent treatment—as, for instance, by the well-known cyanid process.

The screen mechanism which I employ may be either of the rotary type (shown by Figs. 1 to 4, inclusive,) or of the shaking-shoe variety, (illustrated by Figs. 5 and 6;) but in type of screen mechanism the same is either arranged in the housing or hood 11, so as to discharge the material in a sheet-like condition into the chamber or passage 18 or against the inclined wall 15, such screen mechanism being essentially offset into the chamber 18 for the purpose of dropping the material directly into the path of the ascending suction-current.

I will first describe the special construction of the rotary screen, and it should be borne in mind that the gold-bearing sand is designed to be distributed throughout the length of the screen in order that it may be discharged in a sheet-like condition, as set forth.

The screen is designated in its entirety by the numeral 47, and at its ends said cylinder is provided with the heads 48 49, said heads having exit-openings in which are loosely fitted the troughs 55 58, that serve to assist in feeding and discharging the material to and from the revoluble cylinder in the plane of its longitudinal axis. A spider 50 is arranged equidistant from and between the two heads, and a series of bands 51 are between the spider and the heads. The bands are equal in diameter to and arranged concentric with the heads, and these bands and the heads are joined together by the longitudinal bars 52. The bands, however, are not connected directly with the bars, because spacing-blocks 53 are arranged between the bars and the bands at the points where the bars intersect with the bands, whereby the bars are confined within the plane of the cylindrical screen 54. This screen is fitted snugly around the heads and the series of bands, so as to be held in a taut condition thereby, and by interposing the blocks between the bands and the connecting-bars 52 ample space is provided between the screen and the bars for the distribution of the gold-bearing sand throughout the length of the revoluble screen. The parts are secured firmly together in any approved way, so as to render the screen substantial in construction. The feed-trough 55 extends loosely through the opening of the head 49, so as to have its inner end terminate adjacent to the central spider 50, and said trough is provided with perforations 56 in its bottom and with a discharge-lip 57 at its inner end to insure the distribution of the sand through a part of the cylinder at its receiving end. The discharge-trough 58 is fitted loosely in an opening of the head 48, and it is provided at a point exterior to the rotary screen with a spout 59, that carries away the tailings from the screen. A shaft 60 passes axially through the cylinder and the spider 50 thereof, said shaft also passing through the feed and discharge troughs 55 58, respectively. This shaft carries the screw conveyers 61 62, which are arranged in the troughs 55 58, respectively, for the purpose of feeding the material into one end of the cylindrical screen and discharging the tailings from the other end of said screen, and the two conveyers and the spider of the cylinder are made fast to this shaft, which is journaled in proper bearings (not shown) of the screen-housing 11, one end of said shaft being provided with a pulley, as indicated in Fig. 2 by dotted lines, for the purpose of rotating the shaft by a power appliance. The tailings which are retained or kept within the cylinder are lifted into the discharge-trough by suitable buckets 63, which rotate with the cylinder. These buckets are provided at the discharge end of the chamber and in the angle or corner formed by the cylindrical screen and the head 48, (see Figs. 2 and 4,) and these buckets are open at one end for the lodgment of material therein when the bucket is at the lower side of the cylinder, each bucket discharging its load by gravity into the trough 58 when said bucket is at the upper side of the cylinder. I do not desire, however, to strictly confine myself to the rotary type of screen mechanism, because under some circumstances I may desire to employ the shaking-shoe 65 (shown by Fig. 5 of the drawings) as the means for cleaning the gold-bearing sand and discharging the same in a sheet-like condition into the path of the air-current. The housing or hood 11 of the screen mechanism is shaped to correspond to the style of screen mechanism, the chamber of said hood communicating directly with the chamber 18 in order that the screen mechanism may be offset into the primary air-chamber of the apparatus. This shoe is provided with one or a series of screens 66, each provided at its discharge end with a trough 67, adapted to deliver the tailings in any suitable way to the outside of the hood. The shoe is suspended by the hangers 68, (indicated by dotted lines in Fig. 5,) and in the hood is arranged a shoe-driving shaft 69, the same being shown as provided with eccentrics that actuate the links 70, the latter being connected to the shoe. This shaking-shoe is supplied with the gold-bearing sand by the chute or other preferred means, so as to act on the same to separate the refuse from the sand and discharge the latter into the chamber or passage 18. The pneumatic separator shown by Fig. 5 is essentially the same in construction and operation as the separator shown by Fig. 1, and I do not, therefore, consider it necessary to again describe said pneumatic separator.

In treating the gold-bearing sand in large quantities and on an extended scale I employ the system indicated by Fig. 6 of the drawings, which contemplates grading of the ore according to size, crushing the ore and precious metal of certain sizes, and pneumatically treating the different grades of sand and metal individually. In this system I employ a primary receptacle, which I prefer to designate as a "grader" 71, which is equipped with a series of screens of different meshes, said screens being indicated at 72, 73, 74, and 75. The screens are arranged in alinement with each other or in the same plane longitudinally of the grader, so as to occupy a substantially-flush relation and permit the tailings to pass to the succeeding screens. The screen 72 has meshes which are very small, so as to permit the very fine sand and flour-gold to pass therethrough. The screens 73 and 74 are somewhat coarser than the screen 72, and said screen 74 is coarser than the screen 73, which precedes it, while the screen 75 has meshes of larger size than either of the preceding screens. The tailings from the grader are discharged at the tail end thereof after passing over the final screen 75, and the material is supplied in any suitable way to the head end of the grader, so as to lodge upon the fine screen 72. This grader may be reciprocated or moved positively by any suitable mechanical appliances, or it may be arranged in a stationary inclined position for the material to traverse the same by gravity. Said grader is provided on its under side with a series of hoppers 76, each of which receives the gold-bearing sand from the screen arranged above the same, each hopper having a suitable opening 76ª at its bottom for the proper discharge of the material from the screen. Below the series of hoppers provided on the under side of the grader is arranged a series of pneumatic separators, (indicated by the numerals 77 78 79 80,) which are arranged in such relation of the hoppers to the grader as to be supplied individually with the different grades of material through the medium of the spouts or chutes 12. Each pneumatic separator is constructed and adapted for operation in the manner heretofore described and is indicated by Figs. 1 and 5, and each separator operates independently of every other separator of the series, so that the different grades of sand and gold particles therein will be subjected to treatment individually. This system, including the series of independent pneumatic separators, provides for regulation of the suction-currents in the series of separators of different strengths, so that each grade of gold-bearing sand may be treated by a current of a strength suited to the particular material. In order to more thoroughly separate the larger particles of gold from the sand in some grades of material, I employ means for crushing or reducing the coarse grades at a stage subsequent to the grading thereof and before treating the same pneumatically. Between the hopper of the screen 73 and the separator 78 is disposed a pair of coacting crushing-rolls 81, which are arranged to receive the material from the hopper of said screen 73 and reduce or crush the same before it passes into the spout leading to the separator 78. In like manner other pairs of rolls 82 83 are disposed between the screen 74 and separator 79 and the screen 75 and separator 80, respectively, whereby the coarser grades of material are in like manner crushed or reduced before they enter the proper pneumatic separators.

It is thought that the operation and advantages of my invention will be readily understood from the preceding description taken in connection with the drawings.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

Having thus described the invention, what I claim is—

1. In a pneumatic apparatus for separating gold from sand, a series of alternating drop-passages and uptake-passages, the latter having pockets at their lower ends, and said drop-passages having inclined bottoms conducting to said pockets, and said uptake-passages communicating with said drop-passages at their upper end and also at intermediate points above the bottoms thereof, whereby eddies are formed in the lower portions of the drop-passages, for the purpose set forth, substantially as described.

2. In a pneumatic apparatus for separating gold from sand a primary passage having a pocket at its lower end an air-inlet port above said pocket and an outlet-port in its upper side, in combination with a screen mechanism in the upper portion of said primary passage and a series of alternating drop-passages and uptake-passages, one of the former communicating with the outlet-port of the primary passage, and said uptake-passages having pockets at their lower ends communicating therewith and with the lower sides of the drop-passages, and said uptake-passages communicating with said drop-passages at the upper ends and being further provided with intermediate ports above said pockets communicating respectively with the drop-passages, baffles in the drop-passages above said ports and means for creating a current of air through said primary, drop, and uptake passages substantially as described.

In testimony that I claim the foregoing as my own I have hereto affixed my signature in the presence of two witnesses.

JOHN P. STERLING.

Witnesses:
H. I. BERNHORD,
J. M. WALKER.